United States Patent
Meitinger et al.

(10) Patent No.: US 9,463,783 B2
(45) Date of Patent: Oct. 11, 2016

(54) BRAKING APPARATUS FOR WORK MACHINES AND METHOD OF ACTUATING SAID BRAKING APPARATUS

(71) Applicant: Liebherr-Hydraulikbagger GmbH, Kirchdorf/Iller (DE)

(72) Inventors: Bernhard Meitinger, Buxheim (DE); Johannes Lang, Altenstadt (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 0 days.

(21) Appl. No.: 14/053,755

(22) Filed: Oct. 15, 2013

(65) Prior Publication Data
US 2014/0110995 A1 Apr. 24, 2014

(30) Foreign Application Priority Data
Oct. 23, 2012 (DE) .................. 10 2012 020 818

(51) Int. Cl.
| B60T 7/12 | (2006.01) |
| B60T 15/00 | (2006.01) |
| B60T 17/22 | (2006.01) |
| B60T 1/10 | (2006.01) |
| B60T 7/10 | (2006.01) |
| B60T 13/68 | (2006.01) |

(52) U.S. Cl.
CPC .................. B60T 15/00 (2013.01); B60T 1/10 (2013.01); B60T 7/10 (2013.01); B60T 7/12 (2013.01); B60T 17/221 (2013.01); B60T 13/686 (2013.01)

(58) Field of Classification Search
CPC .......... B60T 7/12; B60T 13/66; B60T 13/68; B60T 13/662; B60T 13/686
USPC ....... 303/6.01, 9, 9.61, 122, 122.09, 122.13, 303/122.14
See application file for complete search history.

(56) References Cited

U.S. PATENT DOCUMENTS

| H1912 H | * | 11/2000 | Arndt ............................. 303/3 |
| 2009/0138169 A1 | * | 5/2009 | Uematsu ........................ 701/93 |
| 2011/0316327 A1 | * | 12/2011 | Rekow et al. ................... 303/3 |

FOREIGN PATENT DOCUMENTS

| DE | 103 25 875 A1 | 9/2004 |
| DE | 10 2009 031 742 A1 | 2/2010 |
| DE | 10 2009 031 743 A1 | 2/2010 |
| DE | 10 2011 008 707 A1 | 7/2012 |

OTHER PUBLICATIONS

German Search Report with English Translation dated Jul. 16, 2013 (nine (9) pages).

* cited by examiner

*Primary Examiner* — Thomas J Williams
(74) *Attorney, Agent, or Firm* — Crowell & Moring LLP

(57) ABSTRACT

A braking apparatus for work machines has at least two brakes, each having at least one braking circuit. The braking circuits can each be actuated via at least one control valve, and the control valves can be controlled independently of one another. A processing unit, by which the control valves can be controlled or regulated, an operating circuit, via which the braking circuits can be controlled or regulated manually, and at least one pressure supply are provided, and the control valves can be controlled or regulated under predetermined conditions by the processing unit.

12 Claims, 2 Drawing Sheets

BRAKING APPARATUS FOR WORK MACHINES AND METHOD OF ACTUATING SAID BRAKING APPARATUS

This application claims priority under 35 U.S.C. §119 to German Patent Application 10 2012 020 818.9, filed Oct. 23, 2012, the entire disclosure of which is incorporated herein by reference.

BACKGROUND OF THE INVENTION

1. Field of the Invention

This invention relates to a braking apparatus for work machines and to a method of actuating that braking apparatus.

2. Description of Related Art

Braking apparatus are known in vehicles and in mobile work machines. They are frequently hydraulic control/regulation systems, which can be controlled by the operator of the work machine. It is also known in connection with electronic control/regulation components to connect hydraulic braking apparatus with corresponding control/regulation circuits and thus to extend the functionality of the braking apparatus in comparison with an only manual braking apparatus.

This is known, for example, from so-called anti-lock braking systems, which are used in the most varied vehicles and which also allow automatic access to the brake cylinders in addition to a manual access of the operator to the brake cylinders. In the case of the anti-lock braking system, this automatic intervention takes place for the purpose of stabilizing the handling or braking behavior of the vehicle.

The invention starts from prior art in which an electronic control/regulation system likewise acts on hydraulic brake cylinders, which can also be controlled manually or by a foot pedal. It is in this respect, however, not a question of the stabilization of the braking behavior or of the handling of a work machine, but rather of the control/regulation of the braking behavior of the work machine.

It is known to couple a processing unit with a hydraulic braking system of the work machine to monitor a parked state of the work machine in which the work machine is not moved and the brakes stop the wheels of the work machine from rolling away in an unwanted manner, for example by starting to roll on a slope. This processing unit can, for example, monitor the movement behavior of the work machine. In this respect, the processing unit can determine whether the work machine is in a parked state in which the desired speed is zero. If it is next determined by the processing unit that the actual speed differs from the desired speed, the processing unit can thus initiate an automatic braking procedure in response to the difference.

In a similar situation, the processing unit can determine that the work machine is in a work state in which the desired speed of the vehicle is likewise zero. Analogous to the aforesaid case, the processing unit can effect automatic braking on determining a difference between the desired speed and the actual speed.

The known solutions, however, have some serious disadvantages. In the known apparatus, a single-circuit structure of the braking function is present as a rule. This means that a processing unit switches a valve in the automatic braking procedure. If there is now a disturbance in the apparatus such as a leak in the hydraulic drive or a valve defect, a malfunction of the automatic braking procedure cannot be prevented as a rule. There is no possibility of ensuring a correct function of the braking function despite a leak or a valve defect.

It is also not possible to react correctively to a defective brake actuation in the known braking apparatus, as the brakes could be actuated or released in an unwanted manner.

A malfunction of the braking apparatus can also be caused by a cable break. This is the case when a current is applied to the valve and the brakes release as a consequence of an interruption of the power supply. An unwanted actuation of the brakes can furthermore also be caused via a positive connection to the valves.

SUMMARY OF THE INVENTION

Against this background, it is one object of the present invention advantageously to further develop a braking apparatus of the kind initially mentioned such that the named malfunctions are precluded or occur with less probability.

This object is achieved in accordance with the invention by a braking apparatus for work machines as presently claimed. Advantageous embodiments form the subject of various dependent claims. A braking apparatus for work machines is accordingly provided with at least two brakes, each having at least one brake circuit. The brake circuits can be actuated via at least one control valve each and the control valves can be controlled independently of one another. A processing unit by which the control valves can be controlled or regulated, an operating circuit via which the brake circuits can be controlled or regulated manually, and at least one pressure supply are also included, so that the two control valves can be controlled or regulated under predetermined conditions by the processing unit.

Since each of the at least two brakes comprises at least one brake circuit, it is ensured that in the event of a leak in one of the brake circuits the remaining brake circuit or the remaining brake circuits can still be correctly switched by the processing unit and a braking procedure can be carried out despite a leak.

Different situations are conceivable in which a braking intervention can be carried out by the processing unit. It is particularly advantageous if the conditions under which the processing unit controls or regulates the control valves include determining a leak and/or a rolling of the work machine. The processing unit in this respect determines whether the work machine is in a parked state or in a work state in which rolling is unwanted and controls or regulates the brakes accordingly on determining a leak and/or an unwanted rolling so that the rolling is counteracted. This can also take place when the work machine starts to move in a controlled manner, and the brakes are actuated as a starting aid in this process to prevent an unwanted or premature rolling of the machine.

In a further embodiment, at least one further valve is connected upstream of the at least two control valves. Here, the further valve is a safety valve and controls or regulates the inflow of hydraulic fluid from a hydraulic fluid source to the at least two control valves. This further valve can thus prevent an unwanted actuation of the brakes on a malfunction of the control valves and therefore has the function of a safety valve. In this respect, the safety valve can be controlled or regulated by the processing unit.

In a preferred embodiment, a pressure sensor is furthermore provided between the safety valve and the control valves to monitor the function of the safety valve. This pressure sensor measures the output pressure of the safety valve and can compare it within the course of the function check with an input pressure of the safety valve measured by another pressure sensor or also with the input pressures of the brakes. The comparison values can then be utilized by the processing unit for generating correcting control/regulation signals.

Since the brakes can be controlled or regulated both by the processing unit via the processing unit circuit and by the operator via the operating circuit, it is advantageous to couple the operating circuit and the processing unit circuit, together with the control valves, with one another. In a particularly preferred embodiment, the operating circuit and the control valves are coupled via a respective shuttle valve each to the at least two brake circuits.

The invention further relates to a method of actuating a braking apparatus for work machines having certain features. The method utilizes at least two brakes each having at least one braking circuit, with the braking circuits being actuable via at least one control valve each and with the control valves being controllable independently of one another. A processing unit by which the control valves can be controlled or regulated, an operating circuit via which the braking circuits can be controlled or regulated manually, and a pressure supply are included, with the two control valves being controllable or regulatable under predetermined conditions by the processing unit.

It is advantageous in this respect if the conditions under which the processing unit controls or regulates the at least two control valves include determining the presence of a leak and/or rolling of the work machine.

The rolling determination can in this respect take place in different manners. It is thus conceivable that existing sensors, such as those for the speed measurement of the work machine, or revolution sensors of power units whose movement depends on the movement of the work machine can be used to determine rolling. However, additional sensors can equally transmit measured values to the processing unit. In this manner, a redundancy of or an independence from already installed sensors can be achieved.

In a further preferred embodiment, at least one further valve is connected upstream of the at least two control valves. By way of such a further valve, the inflow of hydraulic fluid from a hydraulic fluid source to the at least two control valves can be controlled or regulated. This safety valve can reduce the probability of an unwanted braking intervention.

Further details and advantages of the invention will now be explained in more detail with reference to two embodiments shown in the drawings.

DETAILED DESCRIPTION OF THE INVENTION

Figure 1:
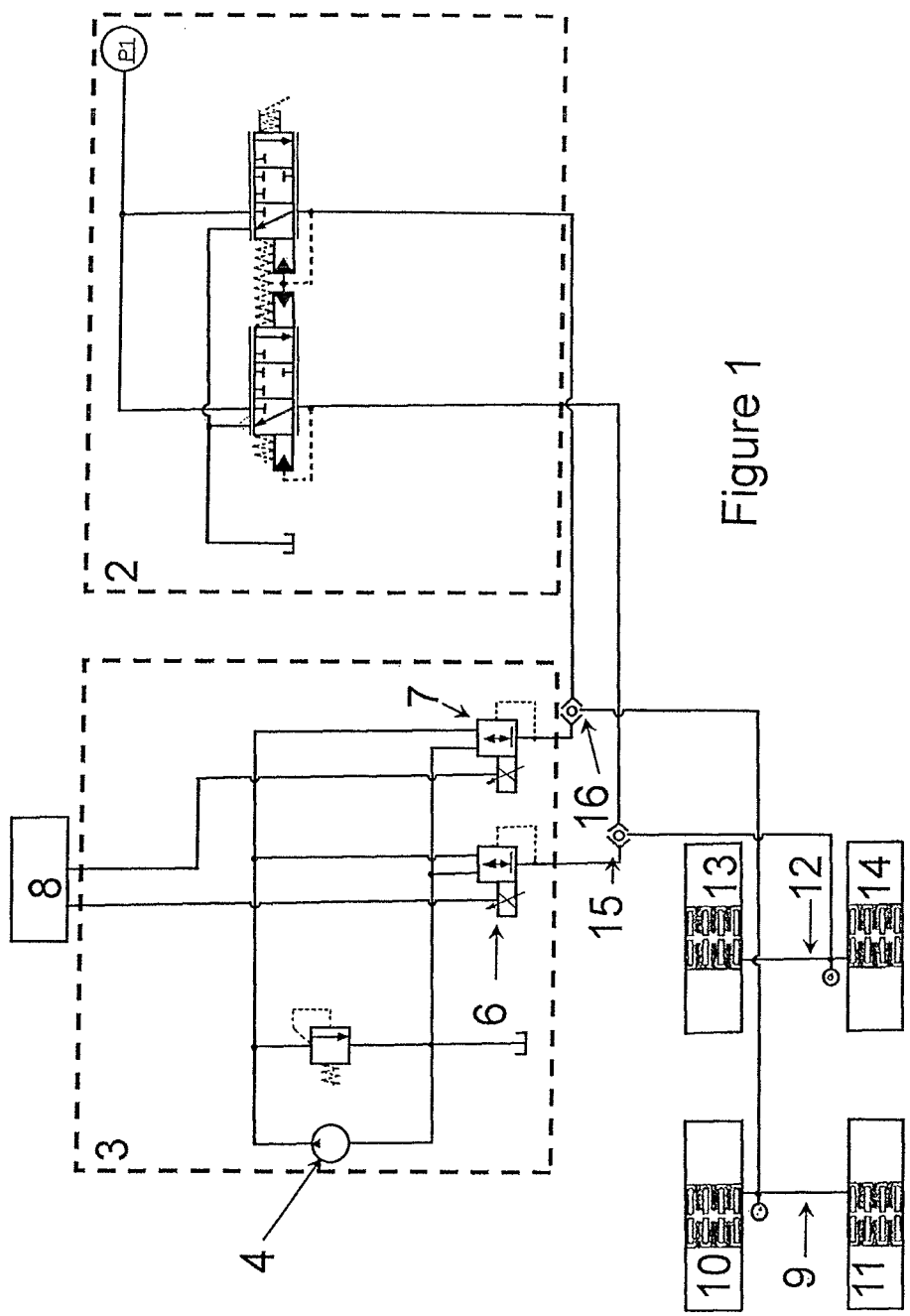
FIG. 1 is a schematic representation of a braking apparatus.

FIG. 1 schematically shows a braking apparatus 1 for work machines having an operating circuit 2 and a processing unit circuit 3. In the embodiment shown, the two circuits have different pressure sources (pumps) 4, P1. The control valves 6, 7 of the processing unit circuit 3 can be controlled or regulated by the processing unit 8 under certain circumstances. If, for example, an unwanted driving off of the work machine is determined, this can be determined by the processing unit 8 and a braking procedure can be initiated as a response thereto in the two brake circuits 9, 12 and thus in the front brakes 10, 11 and in the back brakes 13, 14.

The processing unit circuit 3 is connected to the operating circuit 2 and to the brake circuits 9, 12 via shuttle valves 15, 16. The operating circuit 2 is operated manually or by a foot pedal by the operator, for example. Both the front brakes 10, 11 and the back brakes 13, 14 are actuated by operating the operating circuit 2 as in the above-named example of the processing unit circuit 3.

It can be seen that in the case of a leak in the region of the front brake circuit 9, for example, the back brake circuit 12 is not impaired by the leak since the front brake circuit 9 and the back brake circuit 12 run separately from one another. In the case of a leak in one of the brake circuits 9, 12, the functioning of the brakes can thus be ensured at least in the brake circuit not affected by the leak.

Figure 2:
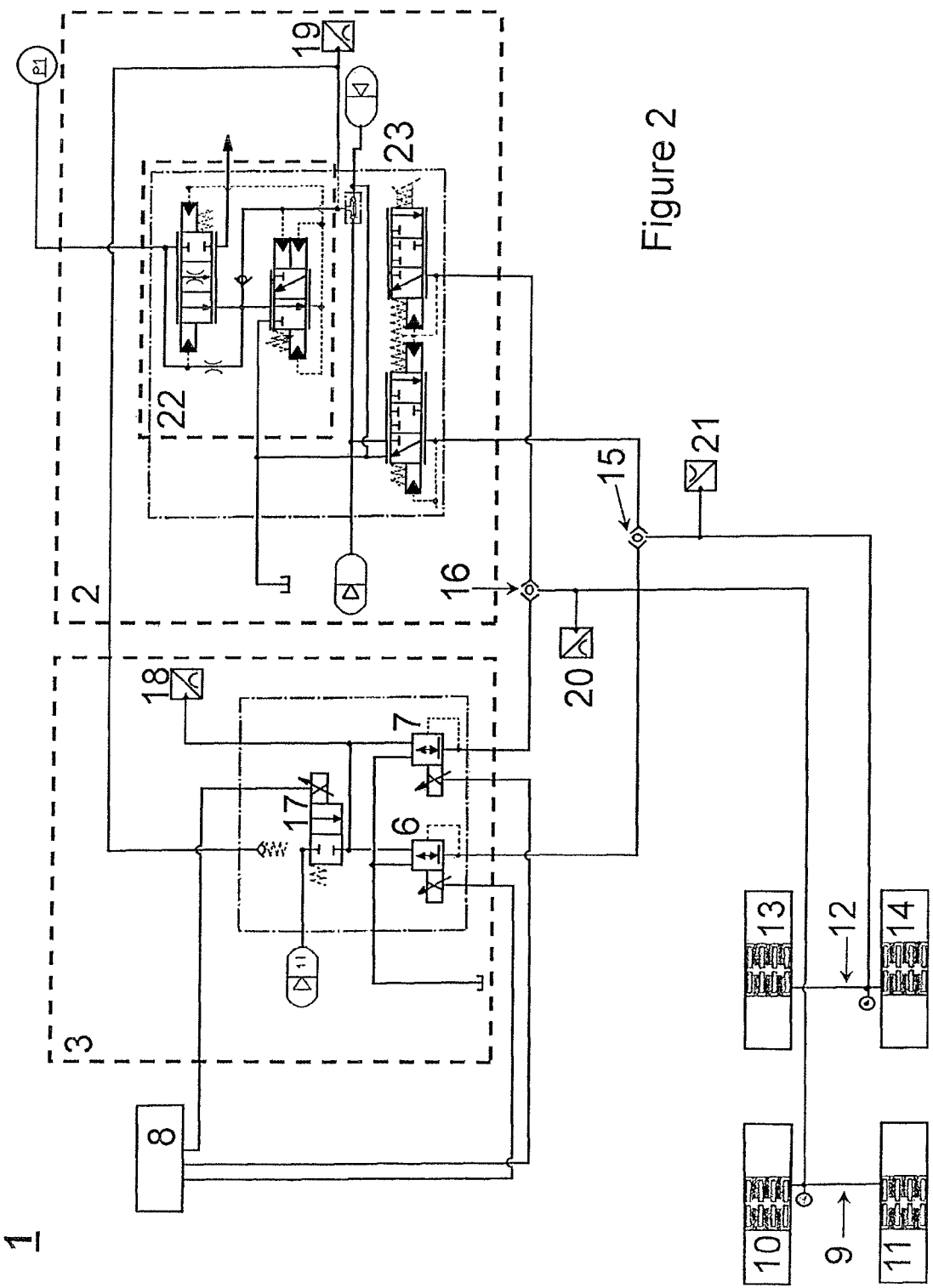
FIG. 2 is a schematic representation of a braking apparatus with a safety valve.

The embodiment shown in FIG. 2 takes up the apparatus of FIG. 1 and expands it to include additional elements.

A safety valve 17 is thus connected upstream of the two known control valves 6, 7 in FIG. 2. This safety valve 17 reduces the probability of an unwanted braking in that a defective braking setting of the control valves 6, 7 is now no longer a sufficient criterion for the occurrence of defective braking. Since the safety valve 17 in the embodiment shown stops the supply of hydraulic fluid to the control valves 6, 7, the safety valve 17 would simultaneously have to be incorrectly connected in addition to the control valves 6, 7 for defective braking to take place. This is less probable than defective braking of only one valve element. The probability of a defective braking procedure is accordingly reduced by the additional safety valve 17.

The processing unit 8 can monitor the correct function of the valves and in particular of the safety valve 17 via correspondingly positioned pressure sensors 18, 19, 20, 21. In the embodiment shown, the operating circuit 2 moreover has additional valves 22 which make possible the storage/charge function of a hydraulic store 23 contained in the system.

The embodiment in FIG. 2, unlike the previously shown example, shows the same pressure source P1 for both the operating circuit 2 and the processing unit circuit 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A braking apparatus for a work machine comprising:
at least two brakes, each having at least one braking circuit, each of the braking circuits being actuatable via either exactly one control valve in that braking circuit or exactly one control valve in that braking circuit and a further valve in that braking circuit connected upstream of the one control valve, the control valves being controlled independently of one another;
a processing unit by which the control valves can be controlled or regulated;
an operating circuit via which the braking circuits can be controlled or regulated manually; and
at least one pressure supply;
wherein the operating circuit and the control valves are coupled to the braking circuits via respective shuttle valves; and wherein the control valves are controllable or regulatable under predetermined conditions by the processing unit independently of the operating circuit.

2. The braking apparatus for a work machine in accordance with claim 1, wherein the predetermined conditions include determining of a leak, rolling of the work machine, or both.

3. The braking apparatus for a work machine in accordance with claim 1, wherein said further valve is a safety valve controlling or regulating an inflow of hydraulic fluid from a hydraulic fluid source to the control valves.

4. The braking apparatus for a work machine in accordance with claim 3, wherein the safety valve can be controlled or regulated by the processing unit.

5. The braking apparatus for a work machine in accordance with claim 3, further comprising a pressure sensor provided between the safety valve and the control valves for monitoring the function of the safety valve.

6. The braking apparatus for a work machine in accordance with claim 2, wherein said further valve is a safety valve controlling or regulating an inflow of hydraulic fluid from a hydraulic fluid source to the control valves.

7. The braking apparatus for a work machine in accordance with claim 6, wherein the safety valve can be controlled or regulated by the processing unit.

8. The braking apparatus for a work machine in accordance with claim 4, further comprising a pressure sensor provided between the safety valve and the control valves for monitoring the function of the safety valve.

9. A method for actuating a braking apparatus for a work machine including at least two brakes, each having either exactly one braking circuit in that braking circuit or exactly one control valve in that braking circuit and a further valve in that braking circuit connected upstream of the one control valve, each of the braking circuits being actuatable via at least one control valve, the control valves being controlled independently of one another, a processing unit by which the control valves can be controlled or regulated, an operating circuit via which the braking circuits can be controlled or regulated manually, respective shuttle valves coupling the operating circuit and the control valves, and a pressure supply, comprising:

controlling or regulating the control valves under predetermined conditions by the processing unit independently of the operating circuit.

10. The method in accordance with claim 9, wherein the predetermined conditions include presence of a leak, rolling of the work machine, or both.

11. The method in accordance with claim 9, wherein the further valve is a safety valve, and further comprising controlling or regulating an inflow of hydraulic fluid from a hydraulic fluid source to the control valves with the safety valve.

12. The method in accordance with claim 10, wherein the further valve is a safety valve, and further comprising controlling or regulating an inflow of hydraulic fluid from a hydraulic fluid source to the control valves with the safety valve.

* * * * *